US006760686B2

(12) United States Patent
Okada

(10) Patent No.: US 6,760,686 B2
(45) Date of Patent: Jul. 6, 2004

(54) DEVICE AND METHOD OF CALCULATING A RESIDUAL VALUE OF AN APPARATUS BASED ON A HISTORY OF USE OF THE APPARATUS AS WELL AS AN ELECTRICAL APPARATUS INCLUDING THE DEVICE

(75) Inventor: Hideo Okada, Uda-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 70 days.

(21) Appl. No.: 09/758,699

(22) Filed: Jan. 11, 2001

(65) Prior Publication Data

US 2001/0007971 A1 Jul. 12, 2001

(30) Foreign Application Priority Data

Jan. 12, 2000 (JP) ....................................... 2000-003465

(51) Int. Cl.$^7$ .............................................. G06F 17/40
(52) U.S. Cl. ...................... 702/187; 702/178; 702/183; 368/10
(58) Field of Search ................................. 702/187, 182, 702/34, 35, 41, 42, 56, 57–58, 64, 65, 115, 117, 118, 124, 130, 132, 136, 138, 140, 178, 179, 180, 181, 183–185, 188, FOR 103, FOR 104, FOR 106, FOR 125, FOR 126, FOR 134, FOR 135, FOR 139, FOR 142, FOR 143, FOR 154, FOR 170, FOR 171; 73/570, 577, 578, 104; 700/108, 110, 174, 175, 177; 340/588, 635, 636, 639, 657, 679, 680, 683, 684, 689, 602; 324/113; 368/9, 10; 374/141, 142; 706/904, 908, 912, 916

(56) References Cited

U.S. PATENT DOCUMENTS

| 5,274,611 A | 12/1993 | Donohoe ...................... 368/10 |
| 5,428,556 A | * 6/1995 | Torizawa et al. .............. 702/34 |
| 5,581,469 A | * 12/1996 | Kim ............................. 702/34 |
| 5,608,845 A | 3/1997 | Ohtsuka et al. ............... 395/50 |
| 5,654,902 A | 8/1997 | Scheidt et al. ......... 364/551.01 |
| 5,726,911 A | * 3/1998 | Canada et al. ................ 702/32 |
| 5,780,725 A | 7/1998 | Tanaka ........................ 73/104 |
| 5,852,793 A | 12/1998 | Board et al. .................. 702/56 |
| 5,867,809 A | 2/1999 | Soga et al. ................. 702/130 |
| 5,877,692 A | * 3/1999 | Watanabe et al. ........... 340/679 |
| 6,349,268 B1 | * 2/2002 | Ketonen et al. ............ 702/130 |
| 6,411,908 B1 | * 6/2002 | Talbott ........................ 702/34 |
| 6,424,930 B1 | * 7/2002 | Wood ......................... 702/184 |
| 6,453,266 B1 | * 9/2002 | Chainer et al. ............. 702/184 |

FOREIGN PATENT DOCUMENTS

| EP | 0 509 817 A1 | 10/1992 |
| EP | 0 623 900 A1 | 11/1994 |
| EP | 0 634 260 A2 | 1/1995 |
| EP | 0 833 548 A1 | 4/1998 |
| FR | 2 734 118 | 11/1996 |
| JP | 9-251486 | 9/1997 |

* cited by examiner

Primary Examiner—Hal D Wachsman
(74) Attorney, Agent, or Firm—Edwards & Angell, LLP; David G. Conlin; George W. Hartnell, III

(57) ABSTRACT

A device for easily calculating a value remaining in an electrical apparatus and decreasing with use includes a sensor for detecting a state of use of the electrical apparatus, and issuing an electrical signal corresponding to the detected state, a determining portion for determining a history of use of the electrical apparatus based on the electrical signal sent from the sensor, a communication portion for receiving a standard residual value of a member of the electrical apparatus, a storing portion connected to the communication portion for storing the received residual value, a calculating portion connected to the history determining portion and the storing portion for calculating the value remaining in the electrical apparatus based on the detected history and the stored residual value, and a monitor connected to the calculating portion for displaying the residual value calculated by the calculating portion.

52 Claims, 12 Drawing Sheets

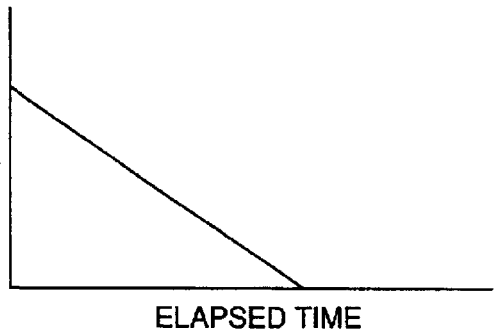
FIG.3A RESIDUAL VALUE / ELAPSED TIME
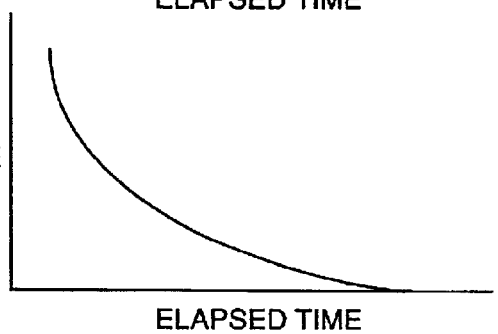
FIG.3B RESIDUAL VALUE / ELAPSED TIME
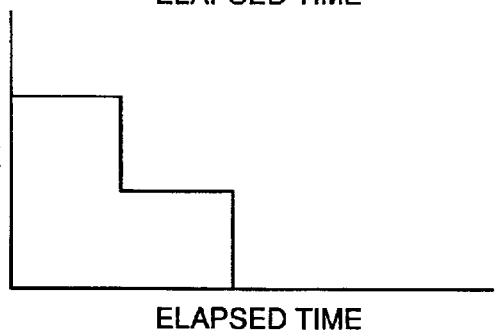
FIG.3C RESIDUAL VALUE / ELAPSED TIME
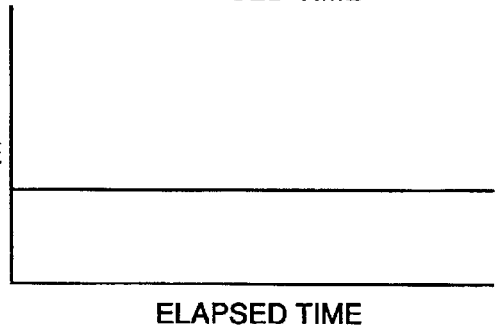
FIG.3D RESIDUAL VALUE / ELAPSED TIME

FIG.4

| VALUABLE MEMBER | RESIDUAL VALUE PATTERN |
|---|---|
| CABINET | D |
| DRUM | A |
| TUB | A |
| MOTOR | B |
| CIRCUIT BOARD | C |

FIG.5

| FREQUENCY EVALUATION POINT | 10 | 7 | 3 | 1 |
|---|---|---|---|---|
| INTEGRATED VALUE OF ENERGIZATION TIME OF CONTROL CIRCUIT | SMALL | MEDIUM | LARGE | EXTREMELY LARGE |
| ELAPSED TIME FROM FIRST USE | | | | |
| CUMULATIVE POWER CONSUMPTION | SMALL | NORMAL | RELATIVELY LARGE | LARGE |

FIG.6

| HANDLING EVALUATION POINT | 10 | 7 | 3 | 1 |
|---|---|---|---|---|
| TIMES OF OPEN/CLOSE MOTION WITH ACCELERATION OF PREDETERMINED MAGNITUDE OR MORE | SMALL | MIDDLE | LARGE | EXTREMELY SMALL |
| TOTAL OPEN/CLOSE TIMES | | | | |

FIG.7

| TIME EVALUATION POINT | 10 | 7 | 3 | 1 |
|---|---|---|---|---|
| ELAPSED TIME FROM MANUFACTURE DATA | ≤ 1 YEAR | ≤ 2 YEARS | ≤ 5 YEARS | ≥ 7 YEARS |
| ELAPSED TIME FROM FIRST USE | ≤ 1 YEAR | ≤ 2 YEARS | ≤ 5 YEARS | ≥ 7 YEARS |

FIG.8

| ENVIRONMENT EVALUATION POINT | 5 | 10 | 5 | 1 |
|---|---|---|---|---|
| AVERAGE USE TEMPERATURE | HIGH 30°C~25°C | NORMAL 25°C~15°C | LOW 15°C~0°C | OUT OF RANGE |
| AVERAGE USE HUMIDITY | HIGH 80%~70% | NORMAL 70%~40% | LOW 40%~10% | OUT OF RANGE |
| ULTRAVIOLET RAY AMOUNT | HIGH | LOW | — | OUT OF RANGE |

| TOTAL EVALUATION POINT | 80 - 61 PTS | 60 - 41 PTS | 40 - 21 PTS | 20 - 11 PTS | ≤ 10 PTS |
|---|---|---|---|---|---|
| RESIDUAL VALUE REDUCING RATE | 100% | 80% | 50% | 30% | 0% |

FIG.13A  STANDARD COURSE

15 MIN. BEFORE END

FIG.13B  RESIDUAL VALUE: 15,000 YEN.

FIG.16A  FILTER IS TO BE
CLEANED.
PLEASE REPLACE
FILTER.

FIG.16B  RESIDUAL
VALUE: 45,000 YEN.

DEVICE AND METHOD OF CALCULATING A RESIDUAL VALUE OF AN APPARATUS BASED ON A HISTORY OF USE OF THE APPARATUS AS WELL AS AN ELECTRICAL APPARATUS INCLUDING THE DEVICE

BACKGROUND OF THE INVENTION

1. Field of the Invention

The present invention relates to a technology for calculating a value remaining in an electrical apparatus, of which value decreases with use, and particularly relates to a technology for calculating the residual value of the electrical apparatus based on its history of use.

2. Description of the Background Art

In recent years, attention has been given on reduction of refuse, garbage or the like for environmental conservation. The refuse or the like can be reduced by reusing or recycling products. In the "reuse" process, a product or a unit (or a part) forming the product is repaired or cleaned, and is used again as the same type of product or unit (or part). In the "recycle" process, a unit or part forming a product is restored to an original material for use as a material (material recycle). Hereinafter, the reuse and the material recycle are inclusively referred to as the "recycle".

For promoting the recycle of products, methods of accurately calculating a value of a product to be recycled have been proposed or developed. As one of such methods, Japanese Patent Laying-Open No. 9-251486 has disclosed a method of calculating values of secondhand or used cars.

The method of calculating the value of the used car disclosed in the above publication can be used when estimating the value of the used car for trade-in or purchase, and includes the steps of determining a manufacturer of a used car to be estimated, selecting a model and a type of the car to be estimated, determining a year of first registration of the car and a type of a transmission thereof, determining a grade of the car, determining a model year of the car, determining a body color of the car, obtaining a basic estimated value from the data thus determined and selected, adding a predetermined value to the basic estimated value if a total mileage is total mileage is shorter than a standard mileage of the same model and type, and subtracting a predetermined value from the basic estimated value if the total mileage is longer than the standard mileage.

According to the disclosed method, the estimated value of the used car for trade-in or purchase can be easily and accurately calculated based on the total mileage, which represents a current state of the car to be estimated.

Although the disclosed method allows calculation of a value remaining in the car based on the total mileage of the car, i.e., a product or article of trade, an electrical apparatus cannot provide an index corresponding to the above total mileage. Therefore, the value remaining in the electrical apparatus cannot be accurately calculated according to the disclosed method. Due to difficulty in calculation of the value remaining in the electrical apparatus, recycle (resale market) of electrical apparatuses is less popular than that of automobiles. For promoting the recycle of electrical apparatuses, it has been desired to provide some method allowing easy determination of residual values of the electrical apparatuses.

SUMMARY OF THE INVENTION

An object of the invention is to provide a history storing device and a history storing method, which allow storage of historical information of an electrical apparatus to be recycled for easy and accurate calculation of a residual value thereof by a collecting agent.

Still another object of the invention is to a residual value calculating device and a residual value calculating method, which allow easy and accurate calculation of a residual value of an electrical apparatus by a collecting agent for recycling the electrical apparatus.

Yet another object of the invention is to provide a residual value calculating device and a residual value calculating method, which allow easy and accurate calculation of a residual value of an electrical apparatus based on characteristics of parts forming the electrical apparatus.

Further another object of the invention is to provide a residual value calculating device and a residual value calculating method, which allow easy and accurate calculation of a residual value an electrical apparatus based on an initial value of the electrical apparatus.

Further another object of the invention is to provide a residual value calculating device and a residual value calculating method, which allow easy and accurate calculation of a residual value an electrical apparatus even if variations occur in characteristics of parts and an initial value of the electrical apparatus.

A further object of the invention is to provide an electrical apparatus, which allows easy and accurate calculation of a residual value by a collecting agent in a recycle process.

A further object of the invention is to provide a recycle method, in which a current trade value can be easily and accurately calculated for recycle.

The invention provides a history storing device for storing a history of use of an electrical apparatus. The history storing device includes a detecting circuit for detecting a state of the electrical apparatus and issuing an electrical signal corresponding to the detected state; a determining circuit connected to the detecting circuit for determining a history of use of the electrical apparatus based on the electrical signal sent from the detecting circuit; and a storage circuit connected to the determining circuit for storing the detected history.

The state of the electrical apparatus detected by the detecting circuit is issued as the electrical signal. The determining circuit determines the history of use of the electrical apparatus based on the electrical signal sent from the detecting circuit. The storage circuit stores the detected history. In this manner, the device can store the state of use of the electrical apparatus.

According to another aspect, the invention provides a residual value calculating device for calculating a value remaining in an electrical apparatus. The residual value calculating device includes a detecting circuit for detecting a state of the electrical apparatus and issuing an electrical signal corresponding to the detected state; a determining circuit connected to the detecting circuit for determining a history of use of the electrical apparatus based on the electrical signal sent from the detecting circuit; a calculating circuit connected to the determining circuit for calculating the value remaining in the electrical apparatus based on the determined history; and an output circuit connected to the calculating circuit for outputting the calculated value.

The state of the electrical apparatus detected by the detecting circuit is issued as the electrical signal. The determining circuit determines the history of use of the electrical apparatus based on the electrical signal sent from the detecting circuit. The calculating circuit calculates the value remaining in the electrical apparatus based on the determined history. The output circuit outputs the calculated value. In this manner, the device can issue the value remaining in the electrical apparatus based on the state of use of the electrical apparatus.

Preferably, the residual value calculating device further includes a storage circuit connected to the calculating circuit for distinguishing parts forming the electrical apparatus based on patterns of variations of residual values with respect to time elapsing, and storing the patterns and the parts belonging to the respective patterns. The calculating circuit includes a circuit connected to the determining circuit and the storage circuit for integrating values remaining in the respective parts forming the electrical apparatus based on the history determined by the determining circuit and the variation patterns of the residual values stored in the storage circuit, and calculating the value remaining in the electrical apparatus.

The storage circuit distinguishes the parts forming the electrical apparatus based on the variation patterns of the residual values with respect to the time elapsing, and stores the patterns, and the parts belonging to the respective patterns. The calculating circuit integrates the residual values of the parts forming the electrical apparatus based on the history determined by the determining circuit and the variation patterns of the residual values stored in the storage circuit, and calculates the value remaining in the electrical apparatus. In this manner, the residual value of the electrical apparatus formed of the plurality of parts can be calculated by integrating the residual values of the parts based on the variation patterns of the residual values of the respective parts.

Preferably, the residual value calculating device further includes a receiving circuit connected to the storage circuit, and receiving the variation patterns for storage in the storage circuit.

The receiving circuit receives the variation patterns for storage in the storage circuit. Thereby, even if the variation patterns vary, the new variation patterns can be received for calculating the value remaining in the electrical apparatus.

Preferably, the residual value calculating device further includes a storage circuit connected to the calculating circuit for storing an initial value of the electrical apparatus. The calculating circuit includes a circuit connected to the determining circuit and the storage circuit for calculating the value remaining in the electrical apparatus based on the initial value and the determined history.

The storage circuit stores the initial value of the electrical apparatus. The calculating circuit calculates the value remaining in the electrical apparatus based on the stored initial value and the detected history. Thereby, the value remaining in the electrical apparatus can be calculated.

Preferably, the residual value calculating device further includes a receiving circuit connected to the storage circuit, and receiving the initial value of the electrical apparatus for storage in the storage circuit.

The receiving circuit receives, as initial values, a value of a new electrical apparatus and a value on a resale market of the electrical apparatus for storage in the storage circuit. Thereby, even if variations occur in the initial values (i.e., the initial value of the new electrical apparatus and/or the value on the resale market), the new initial value(s) are received for calculating the value remaining in the electrical apparatus.

According to still another aspect of the invention, the invention provides a history storing method for storing a history of use of an electrical apparatus provided with a history storing device. The history storing device includes a detecting circuit, a determining circuit and a storage circuit. The history storing method includes the steps of detecting a state of the electrical apparatus by the detecting circuit, and issuing an electrical signal corresponding to the detected state; determining the history of use of the electrical apparatus based on the electrical signal by the determining circuit; and storing the history detected in the step of detecting the history by the storage circuit.

The state of the detected electrical apparatus is issued as the electrical signal. Based on the electrical signal, the history of use of the electrical apparatus is determined, and is stored. Thereby, the state in which the electrical apparatus was used can be stored.

According to yet another aspect, the invention provides a residual value calculating method of calculating a value remaining in an electrical apparatus provided with a residual value calculating device. The residual value calculating device includes a detecting circuit, a determining circuit, a calculating circuit and an output circuit. The residual value calculating method includes the steps of detecting a state of the electrical apparatus by the detecting circuit, and issuing an electrical signal corresponding to the detected state; determining a history of use of the electrical apparatus based on the electrical signal by the determining circuit; calculating a value remaining in the electrical apparatus by the calculating circuit based on the history detected in the step of detecting the history; and outputting the value calculated in the step of calculating the value by the output circuit.

The detected state of the electrical apparatus is issued as the electrical signal. The history of use of the electrical apparatus is determined based on the electrical signal, and the value remaining in the electrical apparatus is calculated based on the determined history. Thereby, the value remaining in the electrical apparatus can be output based on the state of use of the electrical apparatus.

According to further another aspect, the invention provides a storage medium storing in a computer-readable fashion a program, which achieves a history storing method of storing a history of use of an electrical apparatus provided with a history recording device. The history storing method includes the steps of detecting a state of the electrical apparatus by the detecting circuit, and issuing an electrical signal corresponding to the detected state; determining the history of use of the electrical apparatus by the determining circuit based on the electrical signal; and storing by the storage circuit the history determined in the step of determining the history.

The detected state of the electrical apparatus is output as the electrical signal. Based on the electrical signal, the history of use of the electrical apparatus is detected, and is stored. Thereby, the state of use of the electrical apparatus can be stored.

According to a further aspect, the invention provides a storage medium storing in a computer-readable fashion a program, which achieves a residual value calculating method of calculating a value remaining in an electrical apparatus provided with a residual value calculating device. The residual value calculating device includes a detecting circuit, a determining circuit, a calculating circuit and an output circuit. The residual value calculating method includes the steps of detecting a state of the electrical apparatus by the detecting circuit, and outputting an electrical signal corresponding to the detected state; determining a history of use of the electrical apparatus by the determining circuit based on the determining circuit; calculating the value remaining in the electrical apparatus by the calculating circuit based on the history determined in the step of determining the history; and outputting the value calculated in the step of calculating the value by the output circuit.

The detected state of the electrical apparatus is output as the electrical signal. Based on the electrical signal, the history of use of the electrical apparatus is determined, and the value remaining in the electrical apparatus is calculated based on the determined history. Thereby, the value remaining in the electrical apparatus can be output based on the state of use of the electrical apparatus.

According to a further aspect, the invention provides an electrical apparatus recycle method of collecting and recycling an electrical apparatus provided with a residual value calculating device. The residual value calculating device includes a detecting circuit for detecting a state of the electrical apparatus, and issuing an electrical signal corresponding to the detected state; an determining circuit for determining a history of use of the electrical apparatus based on the electrical signal sent from the detecting circuit; and a calculating circuit for calculating the value remaining in the electrical apparatus based on the determined history. The recycle method includes the steps of outputting the value remaining in the electrical apparatus and calculated by the calculating circuit for collecting the electrical apparatus by a collecting agent; and setting a price for sale of the electrical apparatus based on the value output in the step of outputting the residual value.

When the collecting agent collects the electrical apparatus, the value remaining in the electrical apparatus is output, and the price for sale of the electrical apparatus is set based on the output value. Thereby, the collecting agent can easily and accurately set the price for sale of the electrical apparatus based on the state of use of the electrical apparatus.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3D show patterns of variations of residual values with respect to an elapsed time;

FIG. 4 is a table showing residual value patterns of units or parts;

FIG. 5 shows a frequency evaluation point table;

FIG. 6 shows a handling evaluation point table;

FIG. 7 shows a time evaluation point table;

FIG. 8 shows an environment evaluation point table;

FIGS. 13A and 13B show an example of display on an LCD (Liquid Crystal Display) panel shown in FIG. 12;

FIGS. 16A and 16B show an example of display on an LCD monitor shown in FIG. 15;

DESCRIPTION OF THE PREFERRED EMBODIMENTS

First Embodiment

A first embodiment of the invention will now be described with reference to the drawings. In the following description and the figures, the same parts and portions bear the same reference numbers and the same names, and have the same functions. Therefore, description thereof is not repeated where appropriate.

The first embodiment relates to a washing machine including a residual value calculating device.

Figure 1:
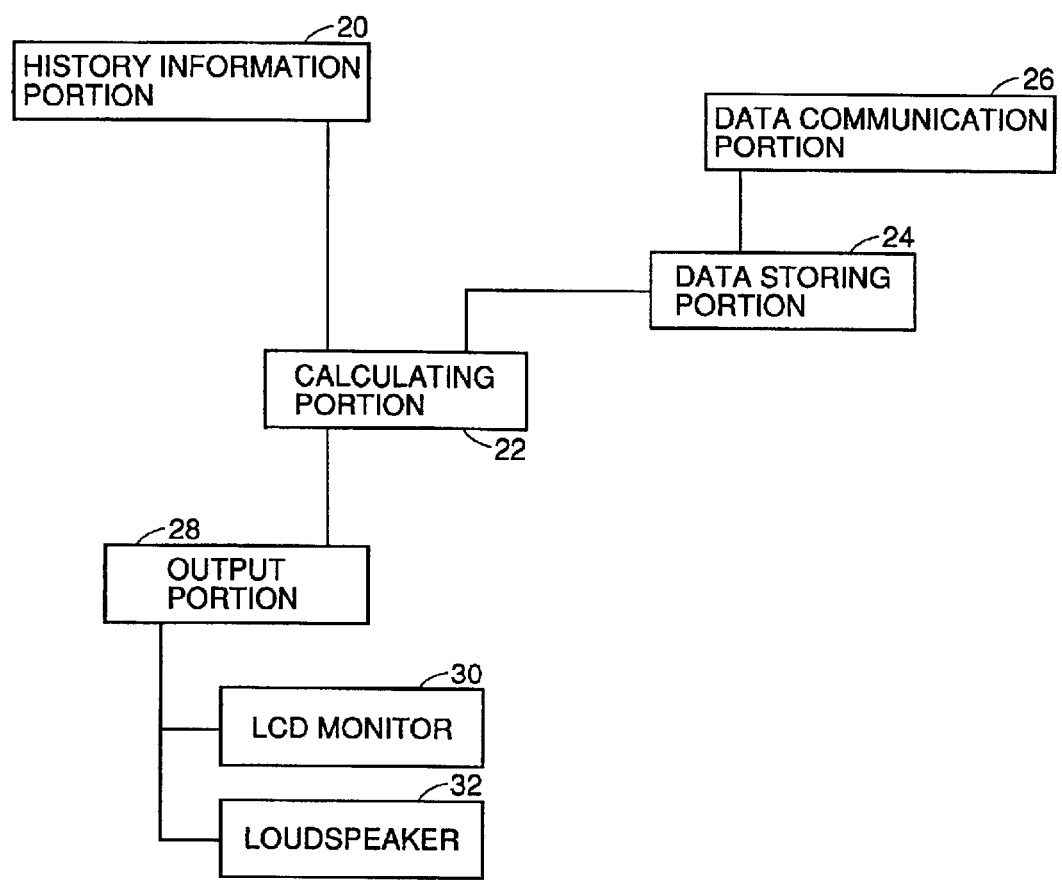
FIG. 1 is a block diagram showing a residual value calculating device in a first embodiment of the invention.

Referring to FIG. 1, a residual value calculating device includes a history information portion 20 for detecting and determining a history of use of a washing machine, a calculating portion 22 which is connected to history information portion 20 for calculating a residual value of the washing machine based on the determined history of use, an output portion 28 connected to calculating portion 22 for outputting the calculated residual value, an LCD monitor 30 and a loudspeaker 32 which are connected to output portion 28, a data storing portion 24 which is connected to calculating portion 22 for storing a standard price of a new washing machine, an average price of a washing machine on a recycle market, residual value patterns which will be described later, evaluation point tables and reduction rates of residual values with respect to the total evaluation point, and a data communication portion 26 which is connected to data storing portion 24 for data communication with an external communication device.

Figure 2:
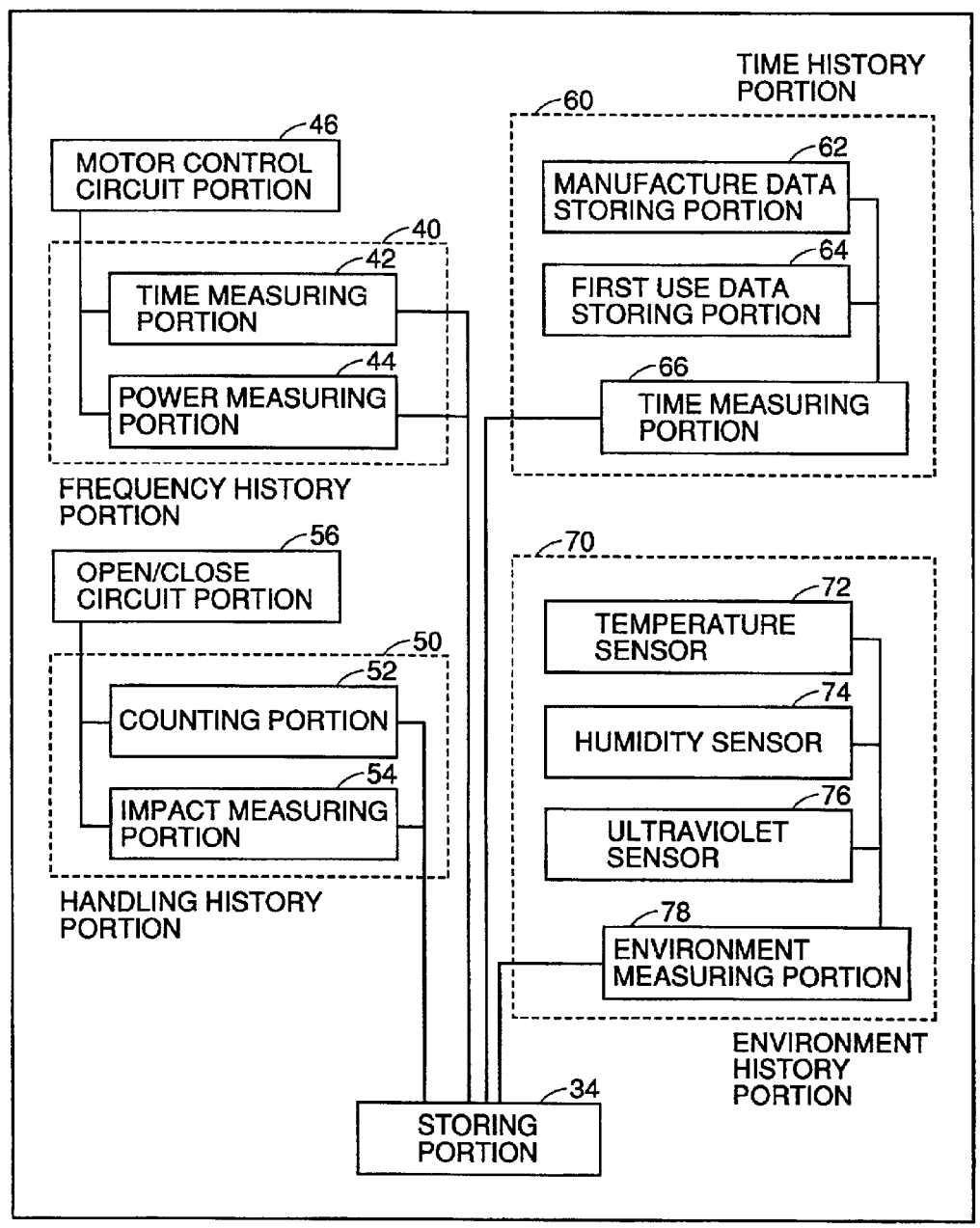
FIG. 2 is a block diagram showing a history information portion in FIG. 1.

Referring to FIG. 2, history information portion 20 includes a frequency history portion 40, a handling history portion 50, a time history portion 60, an environment history portion 70 and a storing portion 34.

Frequency history portion 40 includes a time measuring portion 42 and an electric power measuring portion 44, which are connected to a motor control circuit portion 46 controlling a motor of an agitator and a motor of a drum of the washing machine. Time measuring portion 42 measures and integrates the time for which motor control circuit portion 46 is energized. Power measuring portion 44 measures and integrates the power consumed in motor control circuit portion 46.

Handling history portion 50 includes a counting portion 52 and an impact measuring portion 54, which are connected to an open/close circuit portion 56 of an open/close operating portion such as a lid of the washing machine. Counting portion 52 counts the times at which the lid or the like of the washing machine is opened or closed. The impact measuring portion 54 measures a magnitude of impact caused by an opening or closing motion by an acceleration sensor or the like, which is arranged on or in the lid or a main body.

Time history portion 60 includes a manufacture date storing portion 62 for storing the year and month of manufacture of the washing machine, a first use data storing portion 64 for storing the year and month of first use of this washing machine, and a time measuring portion 66 connected to the manufacture data storing portion 62 and first use data storing portion 64. Time measuring portion 66 is internally provided with a clock function and a calendar function, and calculates the elapsed years and months from the year and month of manufacture stored in manufacture data storing portion 62 as well as the elapsed years and months from the year and month of first use stored in first use data storing portion 64, utilizing the clock and calendar functions.

Environment history portion 70 includes a temperature sensor 72, a humidity sensor 74, an ultraviolet sensor 76 and an environment measuring portion 78 connected to temperature, humidity and ultraviolet sensors 72, 74 and 76, which are used for measuring a use environment of the washing machine, i.e., an environment in which the washing machine was used. Temperature sensor 72 is merely required to measure a temperature around the washing machine. Humidity sensor 74 is merely required to measure a humidity around the washing machine. Ultraviolet sensor 76 is merely required to measure an amount of ultraviolet rays, to which the washing machine is subjected. Any one of sensors 72, 74 and 76 is not restricted to a specific structure.

Storing portion 34 stores an integrated value of the time measured by time measuring portion 42 of frequency history portion 40 (i.e., an integrated value of the time, for which motor control circuit portion 46 is energized), the cumulative amount of power, which is consumed by motor control circuit 46 and is measured by power measuring portion 44, the times of an opening or closing motion of, e.g., the lid counted by counting portion 52 in handling history portion 50, an impact magnitude which is caused by opening or closing the lid, and is measured by impact measuring portion 54, the time lengths (i.e., years and months) which have elapsed from the data of manufacture and the data of first use, and are measured by time measuring portion 66 of time history portion 60, and the temperature and humidity around the washing machine as well as the foregoing ultraviolet rays, which are measured by environment measuring portion 78 of environment history portion 70.

Storing portion 34 stores the number of times of the opening or closing motion, which caused an acceleration of a predetermined magnitude or more measured by impact measuring portion 54 of handling history portion 50. From the number of times of open/close motion with the acceleration of a predetermined magnitude or more as well as the total open/close times measured by counting portion 52, calculation is performed to obtain a rate of the times of open/close motion with the acceleration of a predetermined magnitude or more with respect to the total times of the open/close motion, and the calculated rate is stored.

From the years and months which have elapsed from the data of first use, and are measured by time measuring portion 66 as well as the integrated value of time length of the energization, which are measured by time measuring portion 42 of frequency history portion 40, storing portion 34 calculates and stores the rate of the energization time length of the motor control circuit portion 46 with respect to the elapsed time from the first use.

Data communication portion 26 is provided with a wired or wireless communication device for receiving from an external communication system a standard price or value of the new electrical apparatus and an average price or value of the electrical apparatus on a recycle market. The standard value of the new apparatus and the average value on the recycle market, which are received in the above manner, are used as initial values for calculating the residual value. In addition to the foregoing values, data communication portion 26 can receive residual value patterns of units or parts, which will be described later.

Output portion 28 produces display information for displaying on LCD monitor 30 the residual value calculated by calculating portion 22 as well as a synthetic voice to be output from loudspeaker 32.

Data storing portion 24 stores the residual value patterns of units or parts. The residual value patterns will now be described.

In general, the electrical apparatus is formed of many units or parts. These units or parts can be classified under two groups, i.e., a group in which the unit or part can be repaired and/or cleaned for reuse as a unit or part of a product, and a group in which a material is restored or recovered from the unit or part for reuse as the material. This classification can be performed not only based on the types and kinds of the units and parts, but also based on the time periods of use of the units and parts. This is because the residual value of each unit or part depends on the kind and the elapsed time. Patterns of the residual value with respect to the elapse time can be roughly classified under four groups.

Referring to FIG. 3A, a pattern A relates to a unit or part, which is produced from a material to be reused, and is deteriorated with time, so that the residual value decreases in proportion to the elapsed time. A resin material and others belong to this pattern A.

Referring to FIG. 3B, a pattern B relates to a case where either reuse or recycle is performed depending on the elapsed time. According to pattern B, the residual value exponentially lowers with elapsed time. Electric parts such as electric motors belong to this pattern B.

Referring to FIG. 3C, a pattern C represents such a case that reuse is allowed if the elapsed time is short, but reuse is difficult due to technological innovation and/or change in design if the elapsed time is longer than a predetermined period. According to pattern C, therefore, the residual value decreases stepwise. Circuit boards and others belong to this pattern C.

Referring to FIG. 3D, a pattern D relates to a case where the residual value is stably kept without an influence by the elapsed time. For example, a steel plate forming a cabinet belongs to this pattern D.

As shown in FIG. 4, units and parts of the washing machine according to this embodiment belong to the various residual value patterns.

The calculating portion 22 calculates the residual value of the washing machine based on data, which represents various histories of use, and are stored in storing portion 34 of history information portion 20, as well as the standard price of the new product and the average price on the recycle market, which are stored in data storing portion 24. The above data also includes the residual value patterns.

The calculating portion 22 calculates the frequency evaluation point, handling evaluation point, time evaluation point and environment evaluation point based on the use history data applied from frequency history portion 40, handling history portion 50, time history portion 60 and environment history portion 70. The evaluation points are determined in a discrete fashion giving a 10 to the highest point and a 1 to the lowest point.

Referring to FIG. 5, the rate of the integrated value of time length of energization or power-on with respect to the elapsed time from the time of first use as well as the cumulative amount of consumed power provide the evaluation items for the frequency evaluation point, respectively.

Referring to FIG. 6, the evaluation item for the handling evaluation point is provided by the rate of times of open/dose motion of the lid or the like causing an acceleration of a predetermined magnitude of more with respect to the total open/close times. This evaluation item reflects the gentleness in handling or operation. If almost every open/dose motion caused the acceleration of a predetermined magnitude or more, a 1 is given to the handling evaluation point for representing that the machine was handled very roughly.

Referring to FIG. 7, the elapsed time from the data of manufacture and the elapsed time from the date of first use provide the evaluation items of the time evaluation point, respectively.

Referring to FIG. 8, the average use temperature, the average use humidity and the amount of ultraviolet rays provide the evaluation items of the environment evaluation point, respectively. The average use temperature and the average use humidity are evaluated such that the highest evaluation point of 10 is obtained when the temperature is in the "normal" range from 25° C. to 15° C. and the humidity is in the "normal" range from 70% to 40%, a 5 is given when the temperature and humidity are in the ranges outside but near the above ranges, respectively, and a 1 is given when the temperature and humidity are further outside the above ranges, respectively. The amount of the ultraviolet rays is evaluated as "high" or "low" for obtaining the evaluation point.

Figure 9:
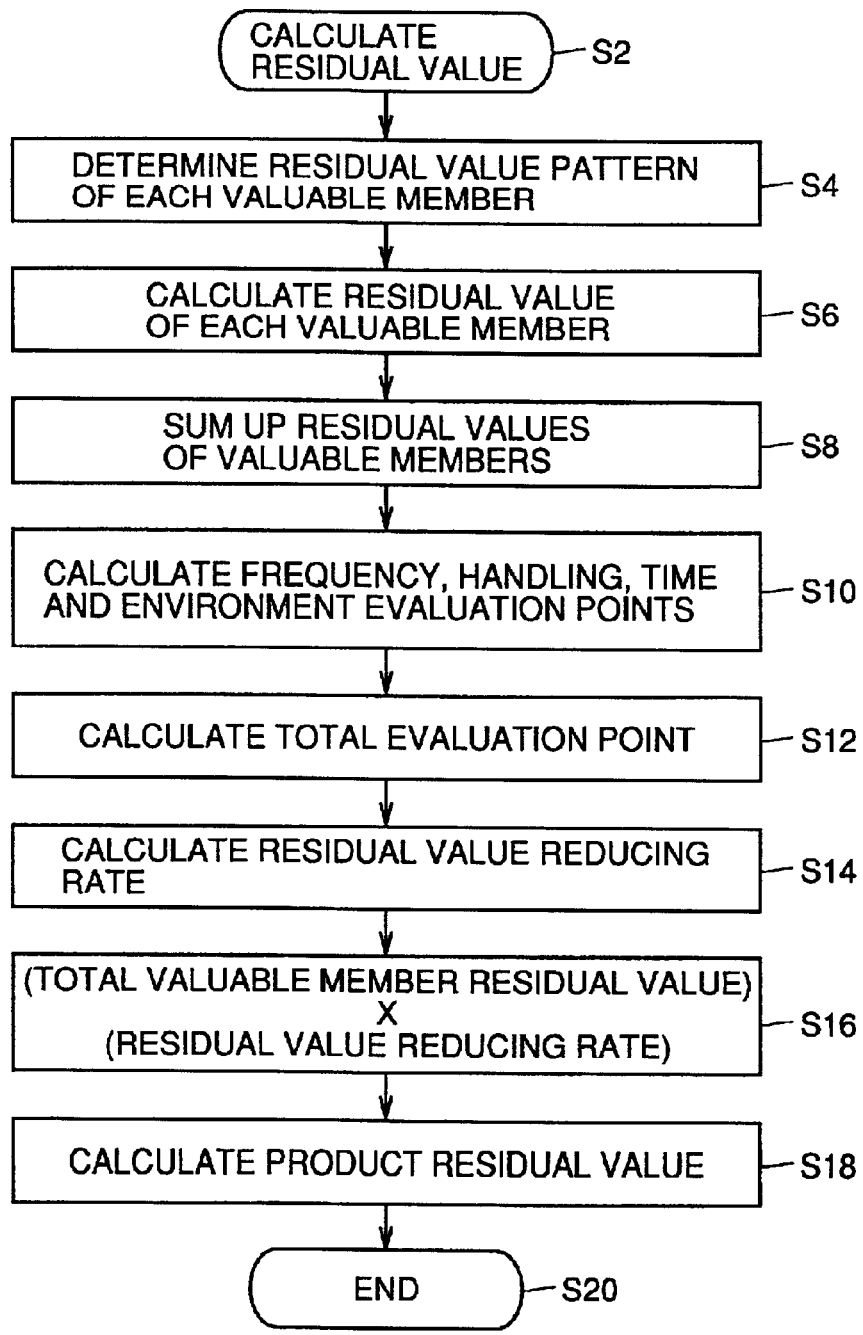
FIG. 9 is a flowchart showing procedures for residual value calculating process.

Referring to FIG. 9, calculating portion 22 in the residual value calculating device calculates the residual value in the following manner.

At step (hereinafter simply referred to as "S") 2, processing for calculating the residual value is instructed when a washing machine is collected, or at an arbitrary time.

At S4, residual value patterns of units or parts are determined based on the residual value patterns stored in data storing portion 24 (see FIG. 4).

At S6, the residual value of each unit or part is calculated based on the residual value pattern of the unit or part thus determined as well as the average price on the recycle market of the unit or part, which is stored in data storing portion 24 through data communication portion 26.

At S8, the residual values of the respective units or parts, which are calculated at S6, are summed up to obtain the residual value of the washing machine.

At S10, information of use history is read out from storing portion 34, and calculation is performed to obtain the frequency evaluation point, handling evaluation point, time evaluation point and environment evaluation point.

At S12, the frequency evaluation point, handling evaluation point, time evaluation point and environment evaluation point calculated at S10 are summed up.

Figures 10, 11:
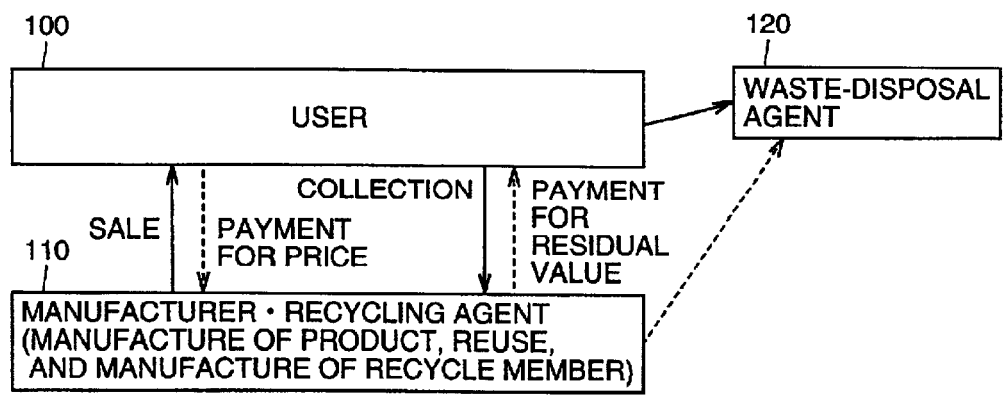
FIG. 10 is a table showing a reducing rate of a residual value with respect to an evaluation point sum.
FIG. 11 is a whole configuration diagram showing a recycle method in the first embodiment of the invention.

At S14, the residual value reducing rate is obtained based on the total evaluation point obtained at S12. Referring to FIG. 10, the residual value reducing rate with respect to the total evaluation point is determined to lower with reduction in total evaluation point.

At S16, the sum of residual values of the washing machine obtained at S8 is multiplied with the reducing rate of the residual value obtained at S14.

At S18, the residual value of the product is obtained from the numerical value obtained by the multiplication at S16. In this manner, it is possible to obtain the residual value of the washing machine giving consideration to the residual value reducing rate, which is calculated based on the history of use, and the residual value of the washing machine is other than the value obtained by merely summing the residual values of the units or parts.

In the foregoing description, history information portion 20 is integrated with the other portions such as calculating portion 22. The invention is not restricted to this, and history information portion 20 may be independent of the other portions such as calculating portion 22. More specifically, such a structure may be employed that history information portion 20 is arranged in an electrical apparatus such as a washing machine, and the processing to be performed by portions such as calculating portion 22 other than history information portion 20 is performed by an independent electronic device such as a personal computer. In this case, a display portion is arranged in storing portion 34 of history information portion 20, and an input portion is arranged in calculating portion 22 so that the display portion can display the history of use stored in storing portion 34, and the displayed history of used can be entered via the input portion. Also, such a structure may be employed that storing portion 34 is formed of a removable memory part, and calculating portion 22 is provided with a portion for accepting or inserting the memory portion and a read portion so that the history of use stored in the memory can be read out through the read portion. Further, such a structure may be employed that storing portion 34 of history information portion 20 is provided with a data sending portion, and calculating portion 22 is provided with a data receiving portion so that the history of use stored in storing portion 34 can be transmitted via the sending and receiving portions.

Description will now be given on the operation of the residual value calculating device having the foregoing structure with reference to a flowchart.

In the following description, it is assumed that the data of manufacture of the washing machine is July 1999, the data of first use is August 1999, the current data is August 2002, the average temperature of use is 20° C., the average humidity of use is 50%, and the machine has been subjected to a small amount of ultraviolet rays.

The washing machine includes, as its units or parts, a cabinet, a drum, a tub, a motor and circuit boards. For each of members of these units or parts, reference is made to preset residual value patterns (see FIG. 3), and the residual value patterns of the respective units or parts are determined (S4).

The residual value of each unit or part is calculated based on the average value of each unit or part on the recycle market stored in data storing portion 24, and the elapsed time from the data of manufacture stored in data storing portion 34 or the elapsed data from the data of first use. In connection with the residual values of the respective units or parts calculated from the elapsed time, it is now assumed that the cabinet is 500 yen, the drum is 2000 yen, the tub is 300 yen, the motor is 3000 yen and the circuit board is 500 yen (S6).

The residual values of units or parts calculated at S6 are summed up. The sum of the residual values of units or parts described above is equal to 6300 yen (S8).

According to the respective tables shown in FIGS. 5 to 8, calculation is performed to obtain the frequency evaluation point, handling evaluation point, time evaluation point and environment evaluation point (S10). In connection with the frequency evaluation point, it is now assumed that the integrated value of time length, for which the control circuit is energized, is in a "middle" range with respect to the elapsed time from the first use, and the cumulative amount of the consumed power is in a "normal" range. In connection with the handling evaluation point, it is assumed that the times of open/close motion, which caused the acceleration of a predetermined magnitude or more, are in a "large" range. Referring to FIG. 5, the frequency evaluation point is equal to 14. Referring to FIG. 6, the handling evaluation point is equal to 3. Referring to FIG. 7, the time evaluation point is equal to 3 when calculated from either the data of manufacture or the data of first use, because both the dates provide the same elapsed period of 3 years. As the environment evaluation point shown in FIG. 8, a value of 10 is given by the average use temperature of 20° C., a value of 10 is given by the average use humidity of 50%, and a value of 10 is given by the amount of ultraviolet rays. The frequency evaluation point of 14, handling evaluation point of 3, time evaluation point 6 and environment evaluation point of 30 are summed up so that the total evaluation point is equal to 53 (S12).

Referring to FIG. 10, since the total evaluation point is equal to 53, it is determined that the residual value reducing rate is equal to 80% (S14).

Referring to FIG. 10, the total residual value of the washing machine, which is equal to 6300 yen and is obtained at S8, is multiplied with the residual value rate of 80% obtained at S14 so that the total residual value of the washing machine becomes equal to 5040 yen.

In this embodiment, the total value remaining in the machine is multiplied with the residual value reducing rate. Alternatively, only the value remaining in the machine may be used. The times of washing operations may be calculated from the times of opening/closing of the lid.

Referring to FIG. 11, description will now be given on the recycle system using the residual value calculating device according to the invention. A user 100 purchases a new electrical apparatus or a used electrical apparatus from a manufacturer or a recycle agent 110, and pays the price for it. User 100 starts using the electrical apparatus. Thereafter, user 100 may think that the electrical apparatus is no longer necessary. In this case, user 100 requests manufacturer or recycling agent 110 to collect it. For this collection, the residual value display device can display the residual value of the electrical apparatus. Manufacturer or recycling agent 110 refers to the residual value displayed on the residual value display device, and determines the purchase price. Manufacturer or recycling agent 110 recycles the units or parts of the collected electrical apparatus. After regular inspection, the units or parts will be on sale as used units or parts, or will be on sale as parts or units of a new product.

Figure 12:
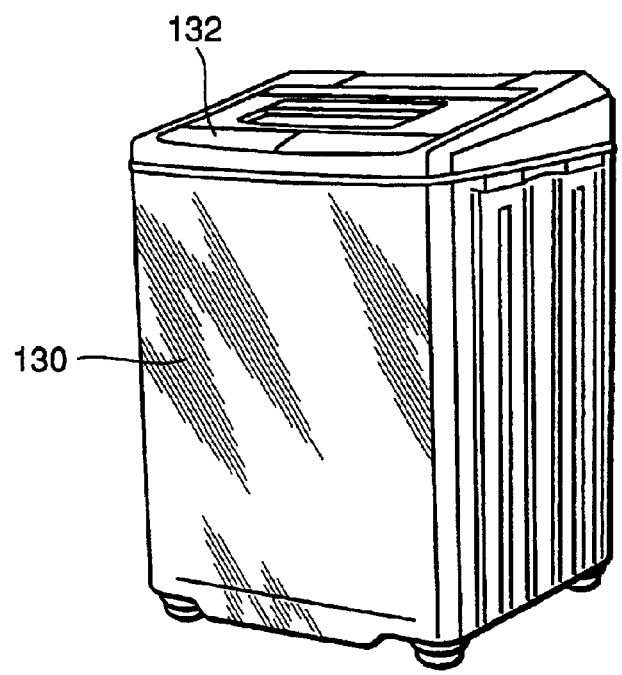
FIG. 12 shows an outer appearance of a washing machine provided with a residual value calculating device in the first embodiment of the invention.

When manufacturer or recycling agent 110 collects the electrical apparatus, the residual value is displayed on a LCD monitor 132 arranged on a top panel of a washing machine 130 shown in FIG. 12 (FIG. 13B). During ordinary use, LCD monitor 132 displays information, e.g., shown in FIG. 13A.

According to the residual value calculating device of this embodiment, as described above, the history of use is accumulated using the control circuit of the electrical apparatus and/or the various sensors arranged in the electrical apparatus, and the residual value of the electrical apparatus can be calculated based on the history of use. Accordingly, it is possible to provide a residual value calculating device, which can easily and accurately calculate the residual value of the electrical apparatus.

Second Embodiment

A second embodiment relates to an air conditioner including the residual value calculating device. In the second embodiment, a whole control block diagram (FIG. 1), patterns of residual values with respect to the elapsed time (FIG. 3), frequency evaluation point table (FIG. 5), handling evaluation point table (FIG. 6), time evaluation point table (FIG. 7), environment evaluation point table (FIG. 8), residual value calculation flow (FIG. 9) and table (FIG. 10) of reducing rate of the residual value with respect to the total evaluation point are the same as those in the first embodiment, and therefore description thereof is not repeated where appropriate.

Figure 14:
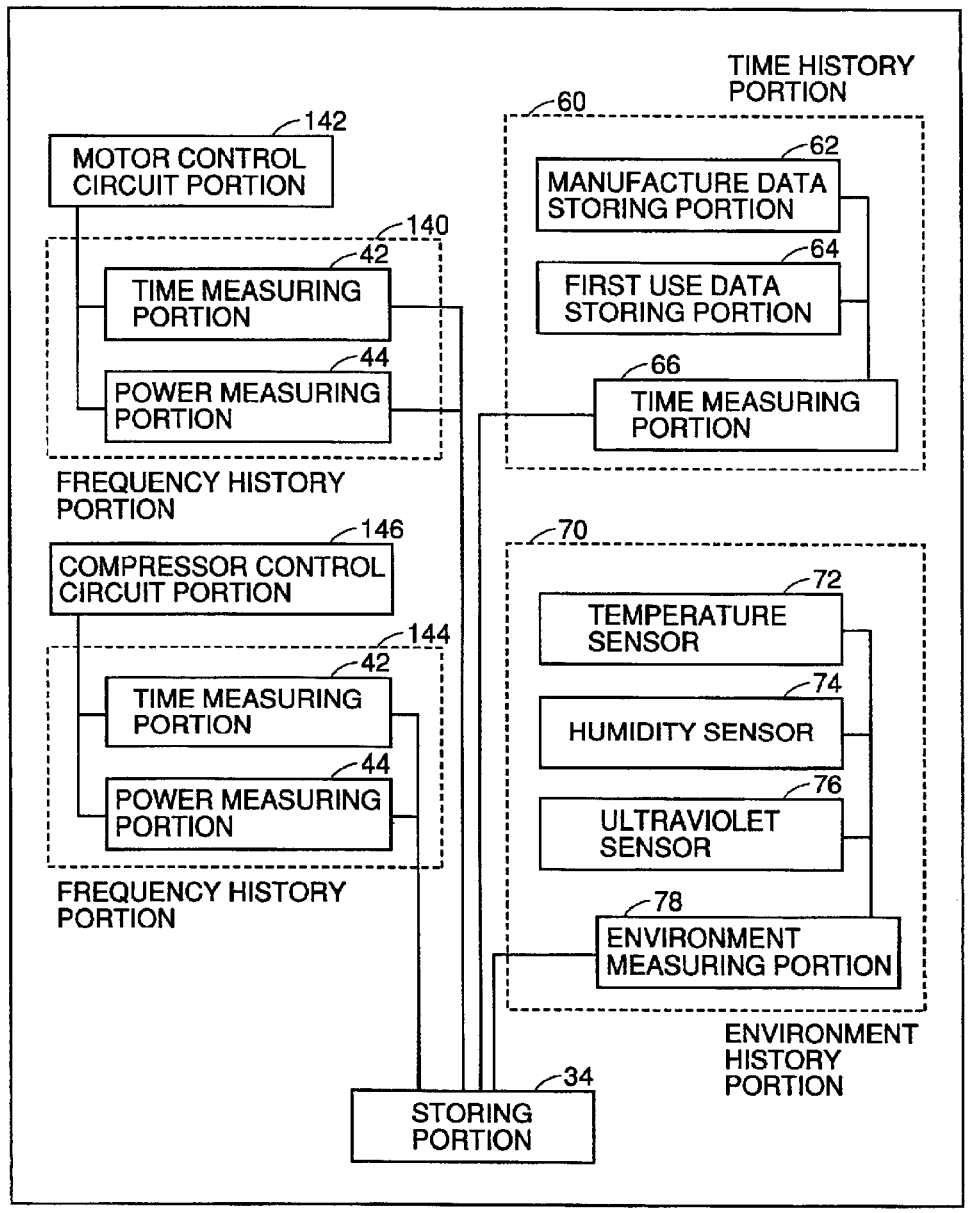
FIG. 14 is a block diagram showing a history information portion in a second embodiment of the invention.

Referring to FIG. 14, history information portion 20 in this embodiment includes a frequency history portion 140, a frequency history portion 144, time history portion 60, environment history portion 70 and storage portion 34.

Frequency history portion 140 includes time measuring portion 42 and power measuring portion 44, which are connected to a motor control circuit portion 142 of a fan motor in a room unit of the air conditioner.

Frequency history portion 144 includes time measuring portion 42 and power measuring portion 44, which are connected to a motor control circuit portion 146 of a compressor in an outdoor unit of the air conditioner.

Time history storing portion 60, environment history portion 70 and storing portion 34 have the same structures and functions as those in the first embodiment, and description thereof is not repeated where appropriate.

Figure 15:
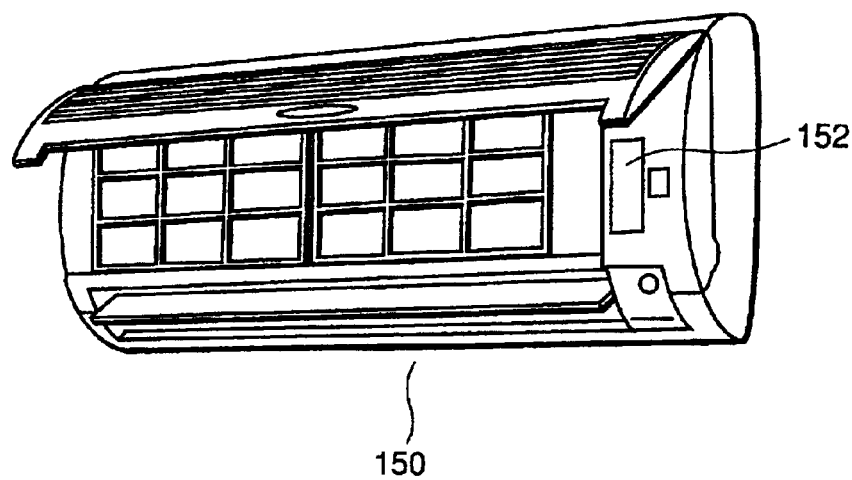
FIG. 15 shows an outer appearance of an air conditioner in the second embodiment.

Referring to FIG. 15, air conditioner 150 in this embodiment displays the residual value, which is calculated by the residual value calculating process, on an LCD panel 152 arranged on a front surface of the room unit (FIG. 16B). During ordinary use, LCD monitor 152 displays information, e.g., shown in FIG. 16A.

Third Embodiment

A third embodiment relates to a refrigerator including the residual value calculating device. In the following description of the third embodiment, description of structures and processing flows, which are the same as those in the first embodiment, is not repeated where appropriate.

Figure 17:
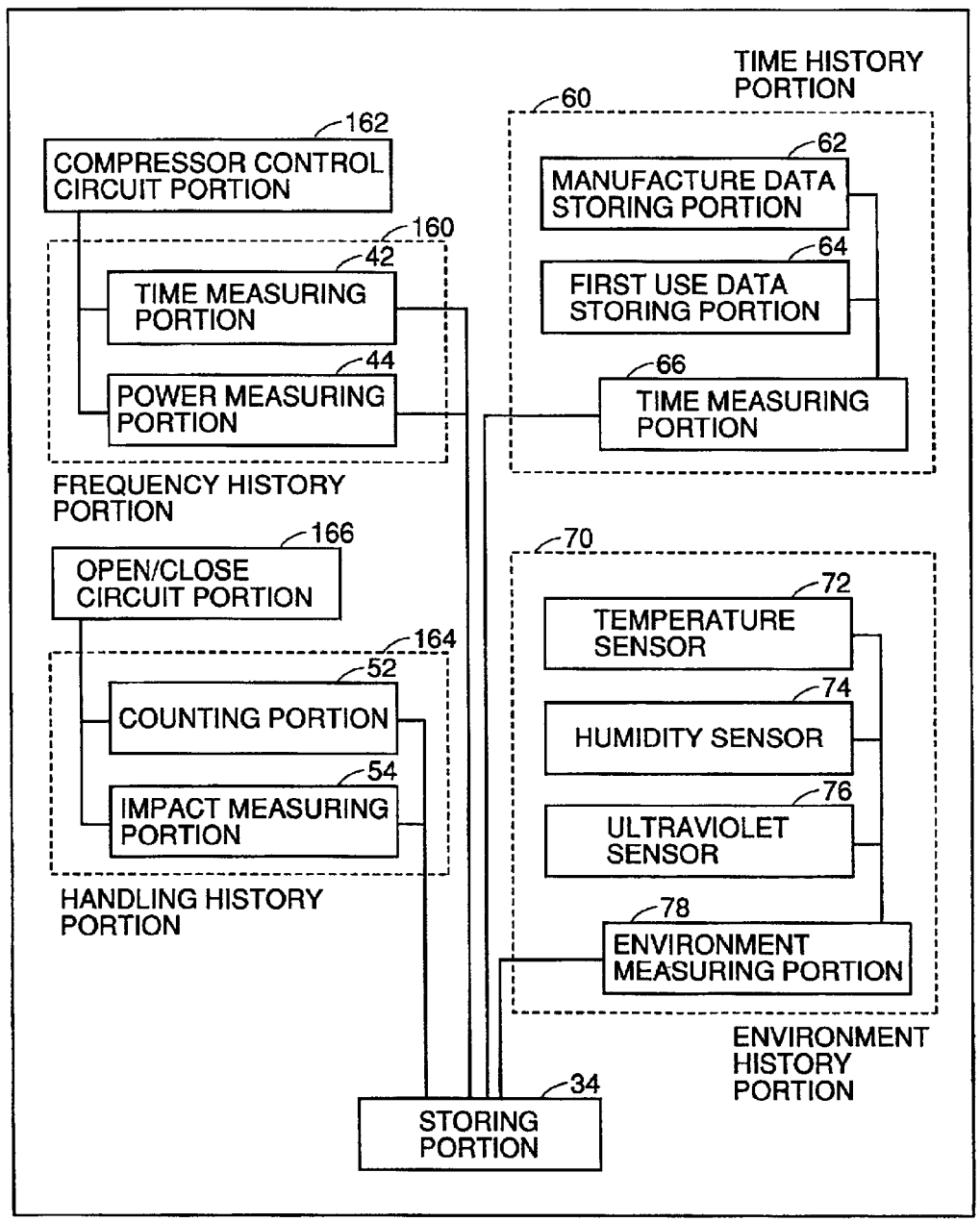
FIG. 17 is a block diagram showing a history information portion in a third embodiment of the invention.

Referring to FIG. 17, history information portion 20 of this embodiment includes a frequency history portion 160, a handling history portion 164, time history portion 60, environment history portion 70 and storing portion 34.

Use history portion 160 includes time measuring portion 42 and power measuring portion 44, which are connected to a compressor control circuit portion 162 controlling a compressor motor of the refrigerator.

Handling history portion 164 includes counting portion 52 and impact measuring portion 54, which are connected to an open/close circuit portion 166 of each door of the refrigerator.

Time history portion 60, environment history portion 70 and storing portion 34 have the same structures and functions as those of the first embodiment, and therefore description thereof is not repeated where appropriate.

Fourth Embodiment

A fourth embodiment relates to a television set or a computer display including the residual value calculating device.

Figure 18:
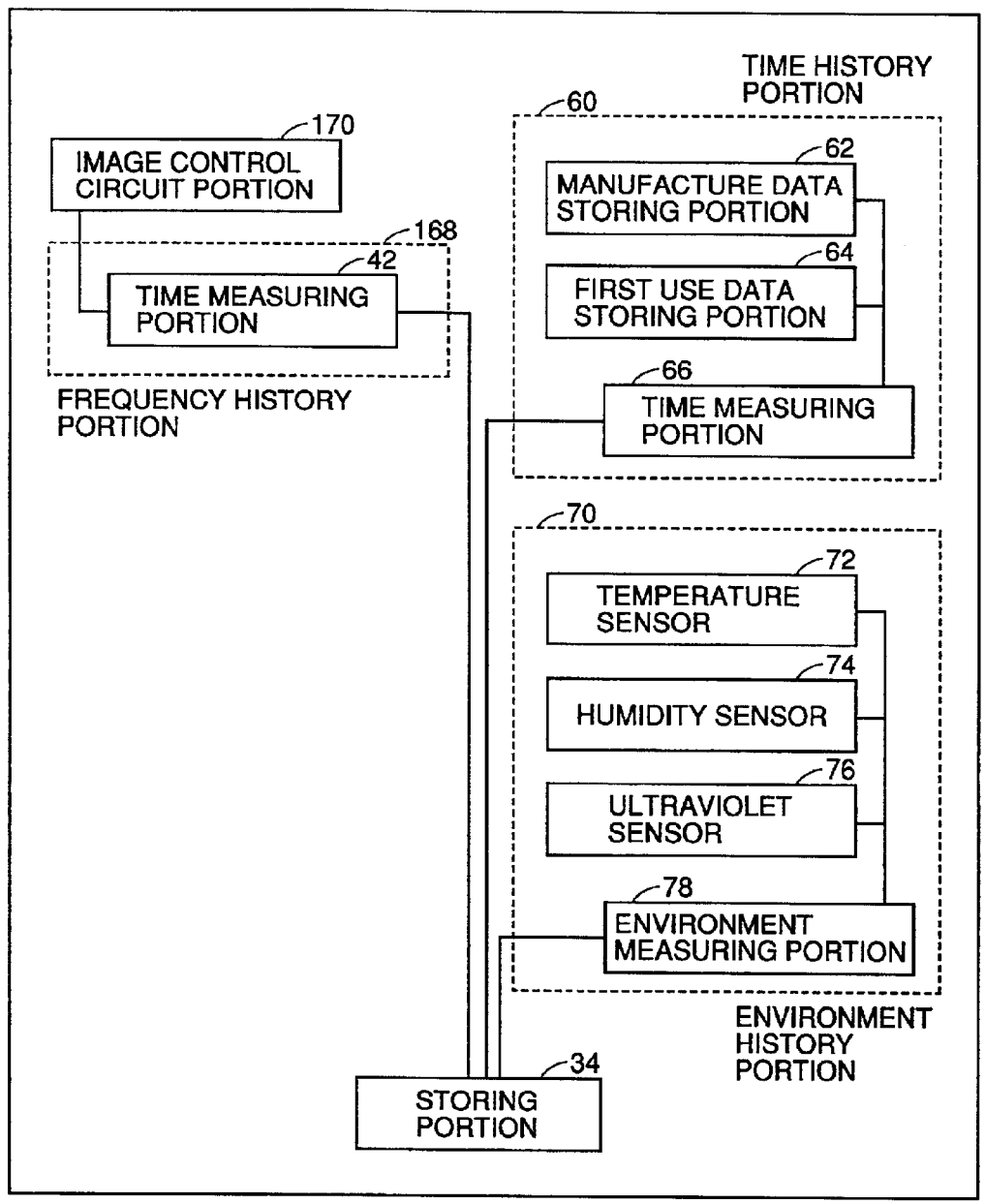
FIG. 18 is a block diagram showing a history information portion in a fourth embodiment of the invention.

Referring to FIG. 18, history information portion 20 of this embodiment includes a frequency history portion 168, time history portion 60 and environment history portion 70.

Frequency history portion 168 includes time measuring portion 42 connected to an image control circuit portion 170 of the television set or display for integrating the time, for which an image is displayed on the television set or display. Time history portion 60, environment history portion 70 and storing portion 34 have the same structures and functions as those of the first embodiment, and therefore description thereof is not repeated where appropriate.

In this embodiment, the highest value of the total evaluation point in FIG. 10 is equal to 60, and therefore the classification of the residual value reducing rate is changed corresponding to it.

As described above, the residual value calculating devices of the second to fourth embodiments can achieve the operations and effects similar to those of the first embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A history storing device for storing a history of use of an electrical apparatus, comprising:
   a detecting circuit for detecting a state of said electrical apparatus, and for issuing an electrical signal corresponding to the detected state, wherein
      said detecting circuit includes a circuit for detecting an elapsed time from at least one of the date of manufacture of said electrical apparatus and the date of first use of said electrical apparatus, and for issuing an electrical signal corresponding to the detected elapsed time;
   a determining circuit, connected to said detecting circuit, for determining a history of use of said electrical apparatus based on the electrical signal sent from said detecting circuit; and
   a storage circuit, connected to said determining circuit, for storing the detected history of use of the electrical apparatus.

2. The history storing device according to claim 1, wherein
   said detecting circuit includes a circuit for detecting a use environment of said electrical apparatus, and for issuing an electrical signal corresponding to the detected use environment.

3. The history storing device according to claim 1, wherein
   said detecting circuit includes a circuit for detecting a frequency of use of said electrical apparatus, and for issuing an electrical signal corresponding to the frequency of use.

4. The history storing device according to claim 1, wherein
   said detecting circuit includes a circuit for detecting a magnitude of impact applied to said electrical apparatus by a user of said electrical apparatus, and for issuing an electrical signal corresponding to the detected magnitude of impact.

5. An electrical apparatus, wherein the electrical apparatus comprises the history storing device according to claim 1.

6. A residual value calculating device for calculating a residual value of an electrical apparatus, comprising:
   a detecting circuit for detecting a state of said electrical apparatus, and for issuing an electrical signal corresponding to the detected state;
   a determining circuit, connected to said detecting circuit, for determining a history of use of said electrical apparatus based on the electrical signal sent from said detecting circuit;
   a calculating circuit, connected to said determining circuit, for calculating the residual value remaining in said electrical apparatus based on the determined history of use of said electrical apparatus;
   an output circuit, connected to said calculating circuit, for outputting the calculated residual value; and
   a storage circuit, connected to said calculating circuit, for distinguishing parts forming the electrical apparatus based on patterns of variations of residual values during an elapsed time, and for storing said patterns of variations of residual values and the distinguished parts forming the electrical apparatus based thereon, wherein
      said calculating circuit includes a circuit, connected to said determining circuit and said storage circuit, for integrating values remaining in the respective parts forming said electrical apparatus based on the history of use determined using said determining circuit and the patterns of variations of the residual values stored in said storage circuit, and for calculating the residual value remaining in said electrical apparatus.

7. The residual value calculating device according to claim 6, further comprising:
   a receiving circuit, connected to said storage circuit, for receiving said patterns of variations of residual values for storage in said storage circuit.

8. The residual value calculating device according to claim 6, further comprising:
   a storage circuit, connected to said calculating circuit, for storing an initial value of said electrical apparatus, wherein
      said calculating circuit includes a circuit, connected to said determining circuit and said storage circuit, calculating the residual value remaining in said electrical apparatus based on said initial value and the determined history of use of the electrical apparatus.

9. The residual value calculating device according to claim 8, further comprising:
   a receiving circuit, connected to said storage circuit, for receiving said initial value for storage in said storage circuit.

10. The residual value calculating device according to claim 6, wherein
    said detecting circuit includes a circuit for detecting an elapsed time from at least one of the date of manufacture of said electrical apparatus and the date of first use of said electrical apparatus, and for issuing an electrical signal corresponding to the detected elapsed time.

11. The residual value calculating device according to claim 6, wherein
    said detecting circuit includes a circuit for detecting a use environment of said electrical apparatus, and for issuing an electrical signal corresponding to the detected use environment.

12. The residual value calculating device according to claim 6, wherein
    said detecting circuit includes a circuit for detecting a frequency of use of said electrical apparatus, and issuing an electrical signal corresponding to the detected frequency of use.

13. The residual value calculating device according to claim 6, wherein
    said detecting circuit includes a circuit for detecting a magnitude of impact applied to said electrical apparatus by a user of said electrical apparatus, and issuing an electrical signal corresponding to the detected magnitude of impact.

14. An electrical apparatus, wherein the electrical apparatus comprises the residual value calculating device according to claim 6.

15. A history storing device for storing a history of use of an electrical apparatus, comprising:
means for detecting a state of said electrical apparatus, and issuing an electrical signal corresponding to the detected state, wherein
said detecting means includes means for detecting an elapsed time from at least one of the date of manufacture of said electrical apparatus and the date of first use of said electrical apparatus, and for issuing an electrical signal corresponding to the detected elapsed time;
means, connected to said detecting means, for determining a history of use of said electrical apparatus based on the electrical signal sent from said detecting means; and
storage means, connected to said determining means, for storing the determined history.

16. The history storing device according to claim 15, wherein
said detecting means includes means for detecting a use environment of said electrical apparatus, and for issuing an electrical signal corresponding to the detected use environment.

17. The history storing device according to claim 15, wherein
said detecting means includes means for detecting a frequency of use of said electrical apparatus, and for issuing an electrical signal corresponding to the detected frequency of use.

18. The history storing device according to claim 15, wherein
said detecting means includes means for detecting a magnitude of impact applied to said electrical apparatus by a user of said electrical apparatus, and for issuing an electrical signal corresponding to the detected magnitude of impact.

19. An electrical apparatus, wherein the electric apparatus comprises the history storing device according to claim 15.

20. A residual value calculating device for calculating a residual value of an electrical apparatus, comprising:
means for detecting a state of said electrical apparatus, and for issuing an electrical signal corresponding to the detected state;
means, connected to said detecting means, for determining a history of use of said electrical apparatus based on the electrical signal sent from said detecting means;
means, connected to said detecting means, for storing the determined history of use;
means, connected to said determining means, for calculating the residual value remaining in said electrical apparatus based on the determined history of use;
means, connected to said calculating means, for outputting the calculated residual value remaining in said electrical appliance;
means, connected to said calculating means, for distinguishing parts forming the electrical apparatus based on patterns of variations of residual values during an elapsed time, and for storing said patterns of variations of residual values and the distinguished parts based thereon,
wherein said calculating means includes means, connected to said determining means and said storage means, for integrating values remaining in the respective parts forming said electrical apparatus based on the history determined by said determining means and the patterns of variations of residual values stored in said storage means, and calculating the residual value remaining in said electrical apparatus.

21. The residual value calculating device according to claim 20, further comprising:
means, connected to said storage means, for receiving said patterns of variations of residual values for storage in said storage means.

22. The residual value calculating device according to claim 20, further comprising:
means, connected to said calculating means, for storing an initial value of said electrical apparatus, wherein
said calculating means includes means, connected to said determining means and said storage means, for calculating the residual value remaining in said electrical apparatus based on said initial value, and the determined history of use.

23. The residual value calculating device according to claim 22, further comprising:
means, connected to said storage means, for receiving said initial value for storage in said storage means.

24. The residual value calculating device according to claim 20, wherein
said detecting means includes means of detecting an elapsed time from at least one of the date of manufacture of said electrical apparatus and the date of first use of said electrical apparatus, and for issuing an electrical signal corresponding to the detected elapsed time.

25. The residual value calculating device according to claim 20, wherein
said detecting means includes means of detecting a use environment of said electrical apparatus, and for issuing an electrical signal corresponding to the detected use environment.

26. The residual value calculating device according to claim 20, wherein
said detecting means includes means for detecting a frequency of use of said electrical apparatus, and for issuing an electrical signal corresponding to the detected frequency of use.

27. The residual value calculating device according to claim 20, wherein
said detecting means includes means for detecting a magnitude of impact applied to said electrical apparatus by a user of said electrical apparatus, and for issuing an electrical signal corresponding to the detected magnitude of impact.

28. An electrical apparatus, wherein said electrical apparatus comprises the residual value calculating device according to claim 20.

29. A history storing method for storing a history of use of an electrical apparatus including a history storing device, said history storing device including a detecting circuit, a determining circuit, and a storage circuit, the method comprising the steps of:
detecting a state of said electrical apparatus using said detecting circuit, and issuing an electrical signal corresponding to the detected state;
wherein said step of issuing said electrical signal includes the sub-steps step of
detecting an elapsed time from at least one of the date of manufacture of said electrical apparatus and the date of first use of said electrical apparatus, and issuing an electrical signal corresponding to the detected elapsed time;

determining the history of use of said electrical apparatus based on said electrical signal using said determining circuit; and storing the history determined in said step of determining the history using said storage circuit.

30. The history storing method according to claim 29, wherein said step of issuing said electrical signal includes the step of detecting a use environment of said electrical apparatus, and issuing an electrical signal corresponding to the detected use environment.

31. The history storing method according to claim 29, wherein said step of issuing said electrical signal includes the step of detecting a frequency of use of said electrical apparatus, and issuing an electrical signal corresponding to the detected use frequency.

32. The history storing method according to claim 29, wherein said step of issuing said electrical signal includes the step of detecting a magnitude of impact applied to said electrical apparatus by a user of said electrical apparatus, and issuing an electrical signal corresponding to the detected magnitude of impact.

33. A residual value calculating method of calculating a residual value remaining in an electrical apparatus including a residual value calculating device, said residual value calculating device including a detecting circuit, a determining circuit, a calculating circuit, a storage circuit, and an output circuit, the method comprising the steps of:

detecting a state of said electrical apparatus using said detecting circuit, and issuing an electrical signal corresponding to the detected state;

determining a history of use of said electrical apparatus based on said electrical signal using said determining circuit;

calculating a residual value remaining in said electrical apparatus using said calculating circuit based on the history of use determined in said step of determining the history of use;

outputting the residual value calculated in said step of calculating said residual value using said output circuit; and distinguishing parts forming the electrical apparatus based on patterns of variations of residual values with respect to time elapsing, and preparing said patterns of variations of residual values and the parts based thereon, wherein said step of calculating the residual value includes the step of integrating values remaining in the respective parts forming said electrical apparatus based on said history of use and said patterns of variations of residual values, and calculating the residual value remaining in said electrical apparatus.

34. The residual value calculating method according to claim 33, further comprising the step of:

receiving said patterns of variations of residual values for storage in said storage circuit.

35. The residual value calculating method according to claim 33, further comprising the step of:

preparing an initial value of said electrical apparatus, wherein said step of calculating the residual value includes the step of calculating a value remaining in said electrical apparatus based on said initial value and said determined history of use.

36. The residual value calculating method according to claim 35, further comprising the step of:

receiving said initial value for storage in said storage circuit.

37. The residual value calculating method according to claim 33, wherein said step of issuing said electrical signal includes the step of detecting an elapsed time from at least one of the date of manufacture of said electrical apparatus and the date of first use of said electrical apparatus, and issuing an electrical signal corresponding to the detected elapsed time.

38. The residual value calculating method according to claim 33, wherein said step of issuing said electrical signal includes the step of detecting a use environment of said electrical apparatus, and issuing an electrical signal corresponding to the detected use environment.

39. The residual value calculating method according to claim 33, wherein said step of issuing said electrical signal includes the step of detecting a frequency of use of said electrical apparatus, and issuing an electrical signal corresponding to the detected frequency of use.

40. The residual value calculating method according to claim 33, wherein said step of issuing said electrical signal includes the step of detecting a magnitude of impact applied to said electrical apparatus by a user of said electrical apparatus, and issuing an electrical signal corresponding to the detected magnitude of impact.

41. A recording medium for recording in a computer-readable fashion a program achieving a history storing method of storing a history of use of an electrical apparatus including a history storing device, said history storing device including a detecting circuit, a determining circuit, and a storing circuit; and said recording medium having instructions to perform the following steps on a microprocessor:

detecting a state of said electrical apparatus using said detecting circuit, and issuing an electrical signal corresponding to the detected state;

wherein said step of issuing said electrical signal includes the sub-steps of detecting an elapsed time from at least one of the date of manufacture of said electrical apparatus and the date of first use of said electrical apparatus; and issuing an electrical signal corresponding to the detected elapsed time;

determining the history of use of said electrical apparatus based on said electrical signal using said determining circuit; and storing the history of use determined in said step of determining the history of use using said storage circuit.

42. The recording medium according to claim 41, wherein said step of issuing said electrical signal includes the step of detecting a use environment of said electrical apparatus, and issuing an electrical signal corresponding to the detected use environment.

43. The recording medium according to claim 41, wherein said step of issuing said electrical signal includes the step of detecting a frequency of use of said electrical apparatus, and issuing an electrical signal corresponding to the detected frequency of use.

44. The recording medium according to claim 41, wherein said step of issuing said electrical signal includes the step of detecting a magnitude of impact applied to said electrical apparatus by a user of said electrical apparatus, and issuing an electrical signal corresponding to the detected magnitude of impact.

45. A recording medium for recording in a computer-readable fashion a program achieving a residual value calculating method of calculating a residual value remaining in an electrical apparatus including a residual value calculating device, said residual value calculating device including a detecting circuit, a determining circuit, a calculating circuit, a storage circuit, and an output circuit; and said recording medium having instructions to perform the following steps on a microprocessor:

detecting a state of said electrical apparatus using said detecting circuit, and issuing an electrical signal corresponding to the detected state;
  wherein said step of issuing said electrical signal includes the sub-steps of:
    detecting an elapsed time from at least one of the date of manufacture of said electrical apparatus and the date of first use of said electrical apparatus, and issuing an electrical signal corresponding to the detected elapsed time;
  determining a history of use of said electrical apparatus based on said electrical signal using said determining circuit;
  calculating a residual value remaining in said electrical apparatus using said calculating circuit based on the history of use determined in said step of determining the history of use; and
  outputting the residual value calculated in said step of calculating the residual value using said output circuit.

46. The recording medium according to claim 45, wherein said residual value calculating method further includes the step of distinguishing parts forming the electrical apparatus based on patterns of variations of residual values with respect to time elapsing, and preparing said patterns of variations of residual values and said parts based thereon; and said step of calculating the residual value includes the step of integrating values remaining in the respective parts forming said electrical apparatus based on said history of use and said patterns of variations of residual values, and calculating the residual value remaining in said electrical apparatus.

47. The recording medium according to claim 46, wherein said residual value calculating method further includes the step of receiving said patterns of variations of residual values for storage in said storage circuit.

48. The recording medium according to claim 45, wherein said residual value calculating method further includes the step of preparing an initial value of said electrical apparatus; and said step of calculating the residual value includes the step of calculating the residual value remaining in said electrical apparatus based on said initial value and said determined history of use.

49. The recording medium according to claim 45, wherein said residual value calculating method further includes the step of receiving an initial value for storage in said storage circuit.

50. The recording medium according to claim 45, wherein said step of issuing said electrical signal includes the step of detecting a use environment of said electrical apparatus, and issuing an electrical signal corresponding to the detected use environment.

51. The recording medium according to claim 45, wherein said step of issuing said electrical signal includes the step of detecting a frequency of use of said electrical apparatus, and issuing an electrical signal corresponding to the detected frequency of use.

52. The recording medium according to claim 45, wherein said step of issuing said electrical signal includes the step of detecting a magnitude of impact applied to said electrical apparatus by a user of said electrical apparatus, and issuing an electrical signal corresponding to the detected magnitude of impact.

* * * * *